(12) United States Patent
Bae

(10) Patent No.: US 10,220,874 B2
(45) Date of Patent: Mar. 5, 2019

(54) RACK ASSIST TYPE POWER STEERING APPARATUS

(71) Applicant: MANDO CORPORATION, Gyeonggi-do (KR)

(72) Inventor: Jae Hoon Bae, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 266 days.

(21) Appl. No.: 15/208,527

(22) Filed: Jul. 12, 2016

(65) Prior Publication Data
US 2017/0021857 A1    Jan. 26, 2017

(30) Foreign Application Priority Data
Jul. 20, 2015   (KR) .................. 10-2015-0102257

(51) Int. Cl.
*B62D 5/04*   (2006.01)
*B62D 3/08*   (2006.01)
*F16H 25/22*  (2006.01)

(52) U.S. Cl.
CPC ............ *B62D 5/0448* (2013.01); *B62D 3/08* (2013.01); *F16H 25/2204* (2013.01)

(58) Field of Classification Search
CPC ...... B62D 5/0448; B62D 5/0445; B62D 3/08; B62D 3/126; F16H 25/2204
See application file for complete search history.

(56) References Cited

U.S. PATENT DOCUMENTS 4,221,137 A  *  9/1980  Futaba ................. B62D 3/08
                                              74/216.3
5,094,119 A  *  3/1992  Virga .................. F16H 25/2209
                                              74/89.42
(Continued)

FOREIGN PATENT DOCUMENTS

JP       06147289 A  *  5/1994 ......... F16H 25/2209

*Primary Examiner* — Joseph M Rocca
*Assistant Examiner* — Maurice L Williams
(74) *Attorney, Agent, or Firm* — Ladas & Parry, LLP

(57) ABSTRACT

The present disclosure relates to a rack assist type power steering apparatus that includes: a ball nut that is rotated by the rotating force transmitted from a motor and has an internal screw groove formed in the inner circumferential surface thereof; and a rack bar that has an external-screw-groove-formed part that has an external screw groove formed in the outer circumferential surface thereof, and is coupled with the ball nut by a ball, wherein the external screw groove has a first curved portion and a second curved portion connected to each other, and is formed such that a contact angle formed by a line that is normal to a tangent line at a point where the ball makes contact with the first curved portion and a line that is normal to a tangent line at a point where the ball makes contact with the second curved portion gradually decreases from the central portion toward opposite end portions of the external-screw-groove-formed part, thereby reducing friction generated when the ball performs a rolling motion in the middle of the external screw groove that is formed in the rack bar and distributing the load acting on the ball in the opposite end portions of the external screw groove that is formed in the rack bar.

3 Claims, 6 Drawing Sheets

(56) References Cited

U.S. PATENT DOCUMENTS

| | | | | |
|---|---|---|---|---|
| 5,988,007 A * | 11/1999 | Nishimura | .......... | F16H 25/2219 |
| | | | | 74/424.87 |
| 2005/0076733 A1* | 4/2005 | Yamamoto | ........... | B62D 5/0448 |
| | | | | 74/424.87 |
| 2005/0268737 A1* | 12/2005 | Inoue | ................. | F16H 25/2204 |
| | | | | 74/89.23 |
| 2007/0000342 A1* | 1/2007 | Kazuno | .............. | F16H 25/2204 |
| | | | | 74/424.83 |
| 2007/0137350 A1* | 6/2007 | Tateishi | ................... | B23G 1/16 |
| | | | | 74/424.87 |
| 2009/0268994 A1* | 10/2009 | Kawashima | ............ | F16C 25/08 |
| | | | | 384/43 |
| 2010/0043582 A1* | 2/2010 | Tateishi | ............... | B23B 27/065 |
| | | | | 74/424.81 |
| 2012/0192663 A1* | 8/2012 | Babinski | ................. | B23P 15/00 |
| | | | | 74/89.23 |
| 2013/0239714 A1* | 9/2013 | Yamanaka | ............. | B62D 5/001 |
| | | | | 74/89.34 |
| 2014/0144263 A1* | 5/2014 | Yoshioka | ............ | B62D 5/0448 |
| | | | | 74/89.23 |
| 2014/0238166 A1* | 8/2014 | Jeon | ......................... | B62D 3/08 |
| | | | | 74/89.23 |
| 2016/0076631 A1* | 3/2016 | Funada | ................... | F16J 15/14 |
| | | | | 74/89.4 |

* cited by examiner

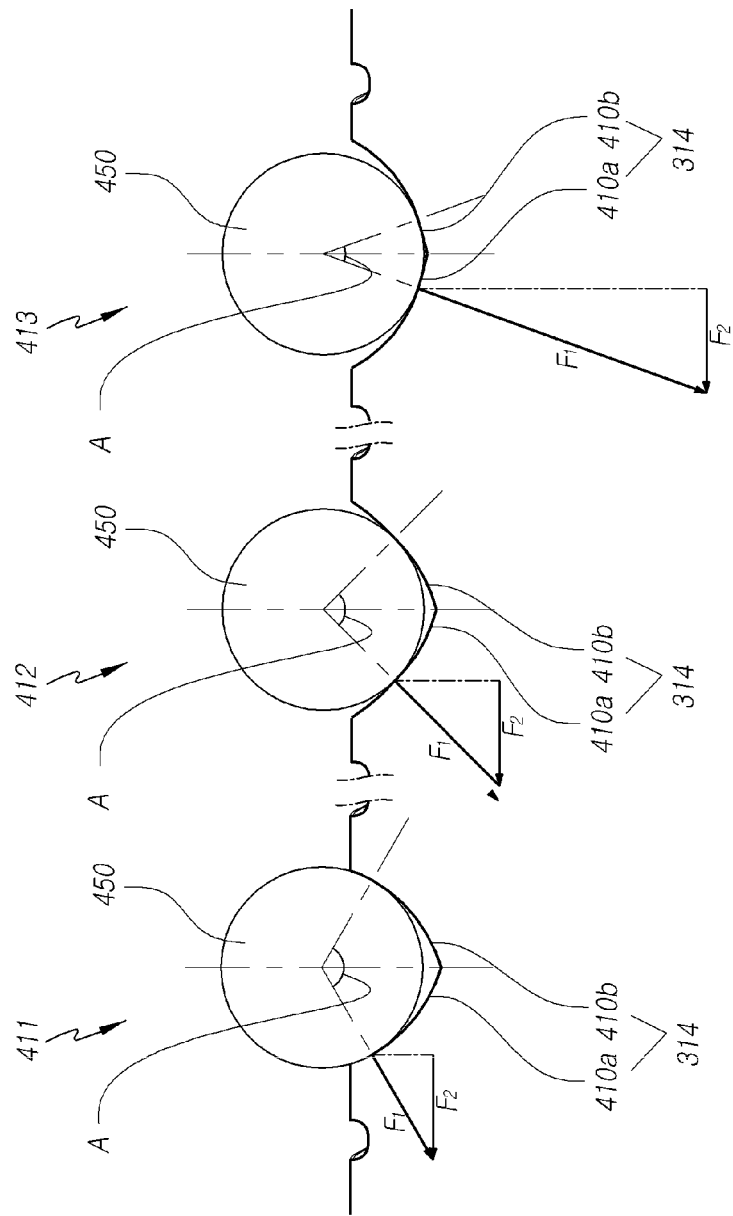

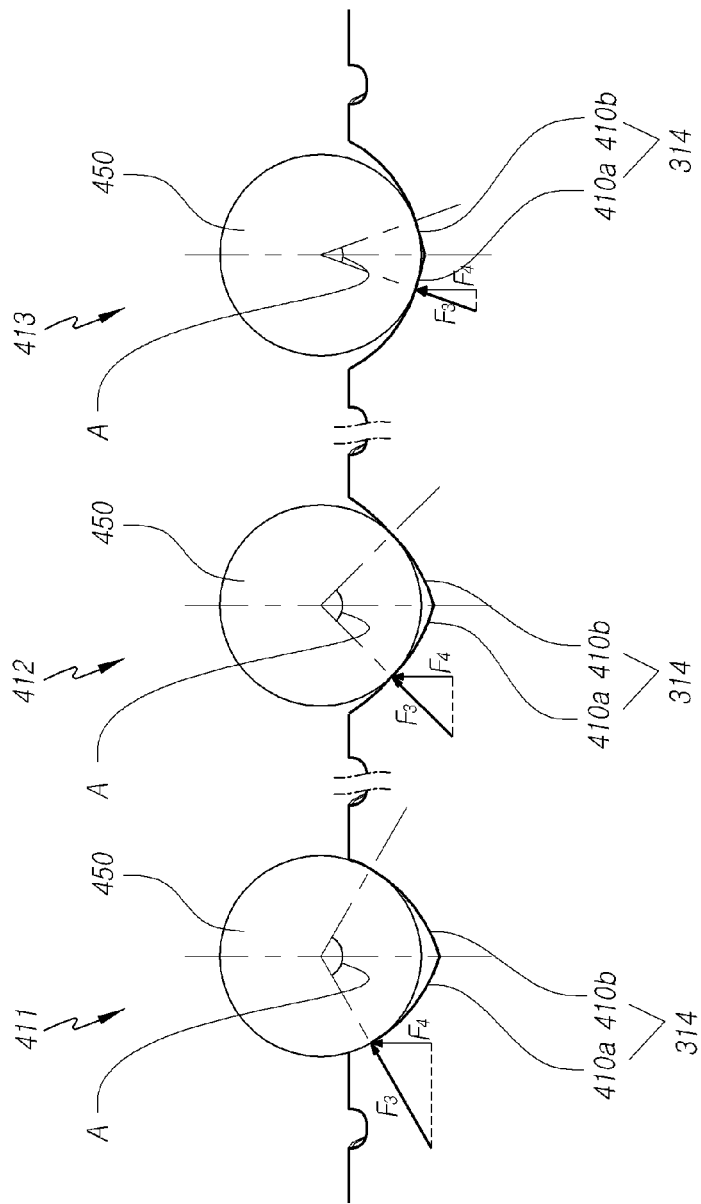

RACK ASSIST TYPE POWER STEERING APPARATUS

CROSS REFERENCE TO RELATED APPLICATION

This application claims priority from Korean Patent Application No. 10-2015-0102257, filed on Jul. 20, 2015, which is hereby incorporated by reference for all purposes as if fully set forth herein.

BACKGROUND OF THE INVENTION

1. Field of the invention

The present invention relates to a rack assist type power steering apparatus, and more specifically, to a rack assist type power steering apparatus in which: a central portion of an external-screw-groove-formed part of a rack bar, which slides leftward and rightward according to a driver's steering, can reduce a friction generated between balls and an external screw groove, thereby reducing noise and effectively transmitting the power of a motor to the rack bar; and opposite end portions of the external-screw-groove-formed part of the rack bar can reduce the loads that are applied to the balls by virtue of a vertical load to prevent damage to the balls and improve the durability of the balls, thereby reducing the loads applied to the balls while decreasing the friction with the balls in the external-screw-groove-formed part of the rack bar.

2. Description of the Prior Art

FIG. 1 is a schematic diagram of a rack assist type power steering apparatus in the related art. FIG. 2 is a schematic sectional view illustrating a part of the rack assist type power steering apparatus in the related art.

As illustrated in the drawings, the rack assist type power steering apparatus in the related art includes: a driving unit 120 that is controlled by an electronic control unit (ECU) to generate power, the electronic control unit (ECU) determining the degree to which a steering wheel 113 is turned through a torque sensor 111 that is mounted on the upper end of a steering column 110; a rack bar 130 that moves tie rods 133, which are connected to wheels 131, according to the degree to which the steering wheel 113 is turned; and a driven unit 140 that receives the rotating force of the driving unit 120, converts the received rotating force into an axial moving force, and transmits the axial moving force to the rack bar 130.

Here, the driving unit 120 includes: an electric motor 121 that is controlled by the electronic control unit (ECU); a driving pulley 123 secured to the shaft of the electric motor 121; and a driving belt 125 wound around the driving pulley 123.

Further, the driven unit 140 includes: a ball nut 141 that is provided within a rack housing, which surrounds the rack bar 130, and supports the rack bar 130; and a driven pulley 143 coupled to the outer circumferential surface of the ball nut 141.

The driving pulley 123 connected to the shaft of the electric motor 121 and the driven pulley 143 coupled to the ball nut 141 are arranged parallel to each other, and the driving belt 125 is coupled to the driving pulley 123 and the driven pulley 143 to transmit the rotating force of the electric motor 121 to the rack bar 130. The rack bar 130 is moved leftward and rightward by the operation of the ball nut 141 to generate an assist force.

An internal helical screw groove 201 that has a Gothic arc shaped cross-section is formed in the inner circumferential surface of the ball nut 141, and an external helical screw groove 203 that has a Gothic arc shaped cross-section is formed in the outer circumferential surface of the rack bar 130. Balls 210 are inserted between the internal screw groove 201 and the external screw groove 203. The balls 210 move by rolling while making contact with the internal screw groove 201 and the external screw groove 203, and circulate through an intermediate passage 205 that is formed by the ball nut 141 and end caps 220 coupled to opposite inner sides of the ball nut 141, respectively.

Meanwhile, a central portion of the external-screw-groove-formed part of the rack bar, which slides leftward and rightward according to a driver's steering, frequently contacts the balls, which increases friction, causes noise, and precludes the power of the motor from being effectively transmitted to the rack bar.

Further, when a driver steers to the maximum, opposite ends of the external-screw-groove-formed part of the rack bar move into the ball nut, and the varying angles of the tie rods increase accordingly so that the loads applied to the opposite ends of the rack bar become larger. Due to this, the loads applied to the balls increase, thereby causing scratches on the balls and deteriorating the durability of the balls.

SUMMARY OF THE INVENTION

In this background, an aspect of the present invention is to provide a rack assist type power steering apparatus in which the central portion of an external-screw-groove-formed part of a rack bar, which slides leftward and rightward according to a driver's steering, can reduce the friction generated between balls and the external screw groove, thereby reducing noise and effectively transmitting the power of a motor to the rack bar.

Another aspect of the present invention is to provide a rack assist type power steering apparatus in which opposite end portions of the external-screw-groove-formed part of the rack bar can reduce the loads that are applied to the balls by virtue of a vertical load to prevent damage to the balls and improve the durability of the balls, thereby reducing the loads applied to the balls while decreasing friction with the balls in the external-screw-groove-formed part of the rack bar.

The aspect of the present invention is not limited thereto, and other unmentioned aspects of the present invention may be clearly appreciated by those skilled in the art from the following descriptions.

According to the present invention, there may be provided a rack assist type power steering apparatus that includes: a ball nut that is rotated by the rotating force transmitted from a motor and has an internal screw groove formed in the inner circumferential surface thereof; and a rack bar that has an external-screw-groove-formed part that has an external screw groove formed in the outer circumferential surface thereof, and is coupled with the ball nut by a ball, wherein the external screw groove has a first curved portion and a second curved portion connected to each other, and is formed such that a contact angle formed by a line that is normal to a tangent line at a point where the ball makes contact with the first curved portion and a line that is normal to a tangent line at a point where the ball makes contact with the second curved portion gradually decreases from the central portion toward opposite end portions of the external-screw-groove-formed part.

According to the present invention, the central portion of the external-screw-groove-formed part, which frequently contacts the ball, can reduce the friction generated between the ball and the external screw groove while the rack bar slides leftward and rightward, thereby reducing noise, improving a driver's feeling of steering, and effectively transmitting the power of the motor to the rack bar.

In addition, the opposite end portions of the external-screw-groove-formed part, to which a large vertical load is applied, can reduce the load that is applied to the ball by virtue of the vertical load to prevent damage to the ball and improve the durability of the ball, thereby reducing the load applied to the ball while decreasing friction with the ball in the whole external-screw-groove-formed part.

BRIEF DESCRIPTION OF THE DRAWINGS

The above and other objects, features, and advantages of the present invention will be more apparent from the following detailed description taken in conjunction with the accompanying drawings, in which:

FIG. 5 is a view illustrating the friction generated between balls and an external screw groove according to contact angles of the balls of the rack assist type power steering apparatus according to embodiment.

FIG. 6 is a view illustrating the loads transmitted to the balls according to the contact angles of the balls of the rack assist type power steering apparatus according to embodiment.

DETAILED DESCRIPTION OF THE EXEMPLARY EMBODIMENTS

Figure 1:
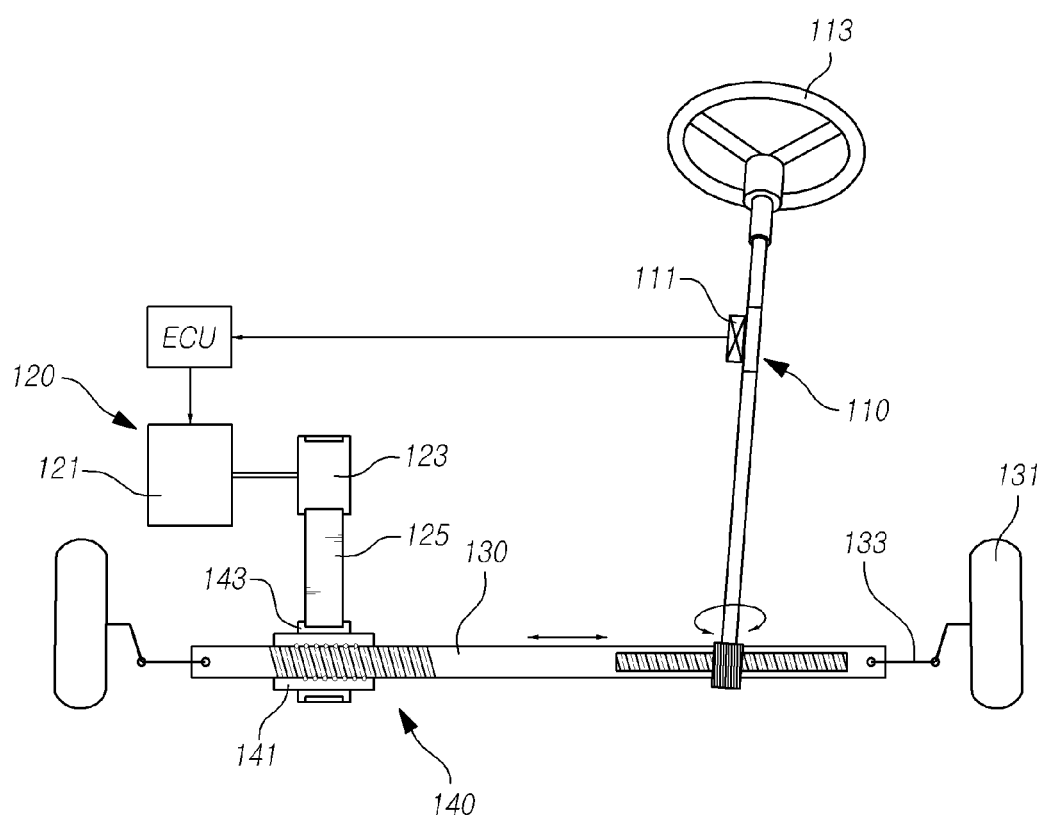
FIG. 1 is a schematic diagram of a rack assist type power steering apparatus in the related art.

Hereinafter, embodiments of the present invention will be described in detail with reference to the accompanying drawings. In adding reference numerals to elements in each drawing, it should be noted that the same elements are designated by the same reference numerals, if possible, although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
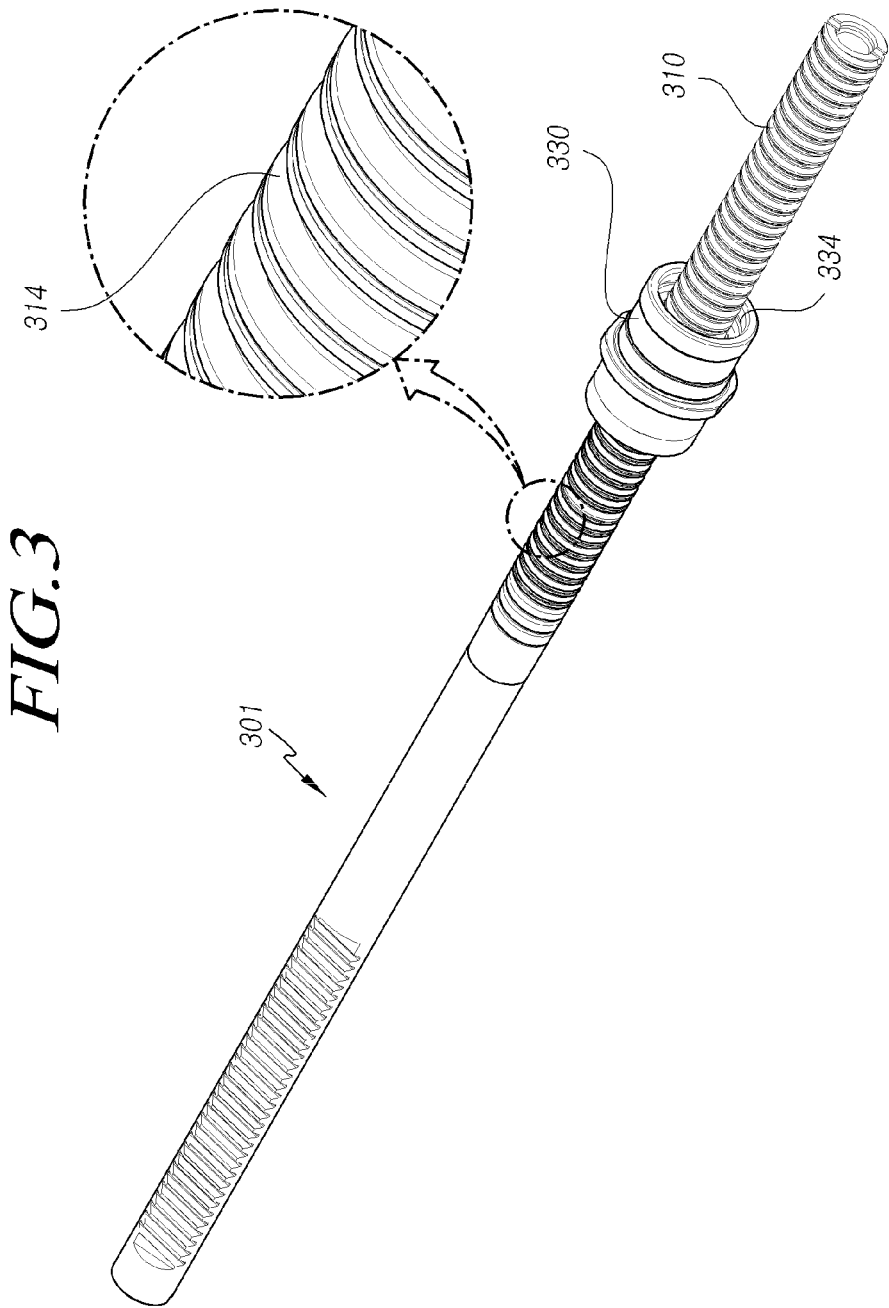
FIG. 3 is a perspective view of a rack assist type power steering apparatus according to embodiment.
Figure 4:
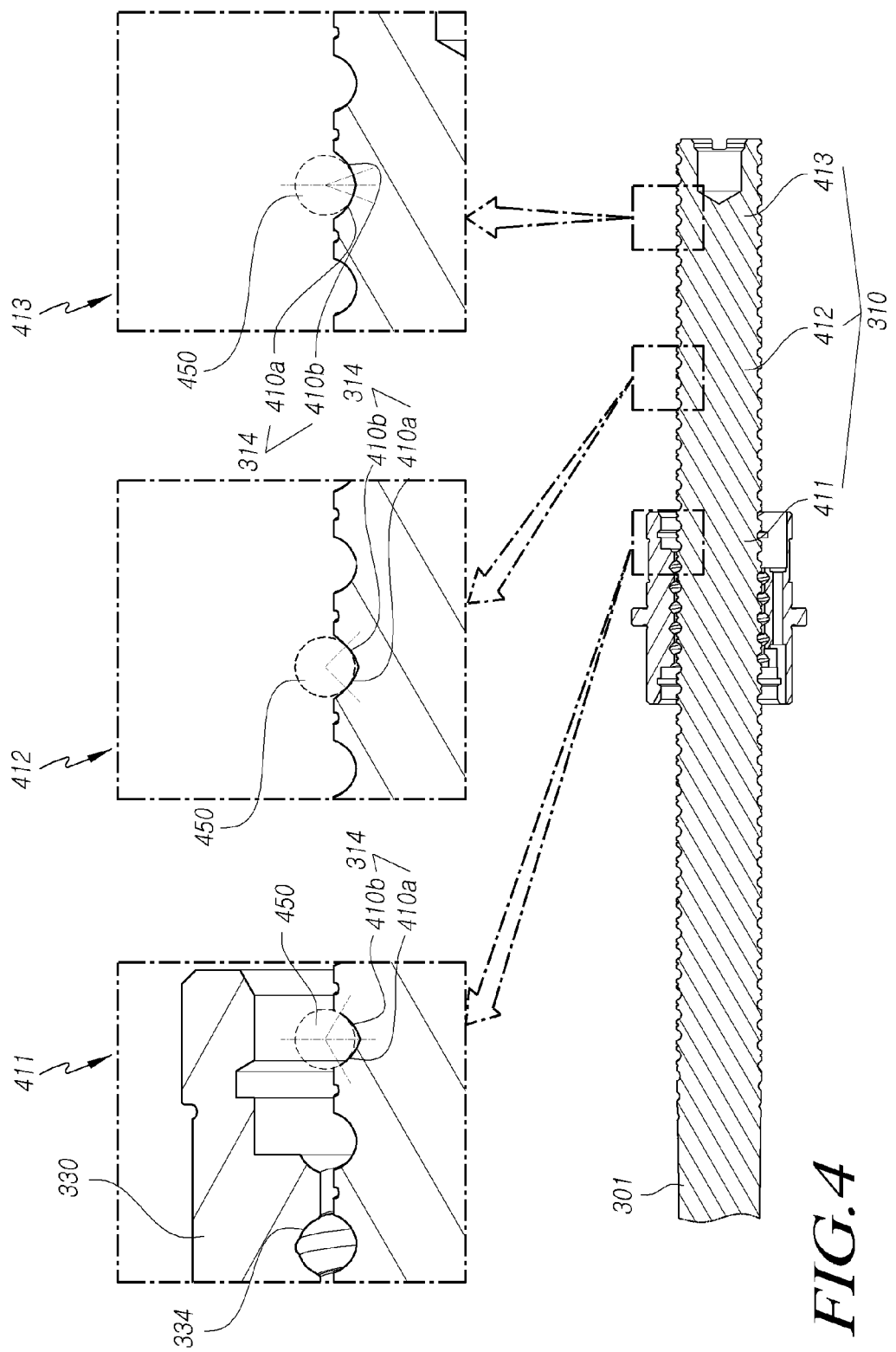
FIG. 4 is a sectional view of the rack assist type power steering apparatus according to embodiment.

FIG. 3 is a perspective view of a rack assist type power steering apparatus according to embodiment. FIG. 4 is a sectional view of the rack assist type power steering apparatus according to embodiment. FIG. 5 is a view illustrating the friction generated between balls and an external screw groove according to contact angles of the balls of the rack assist type power steering apparatus according to embodiment. FIG. 6 is a view illustrating the loads transmitted to the balls according to the contact angles of the balls of the rack assist type power steering apparatus according to embodiment.

Figure 2:
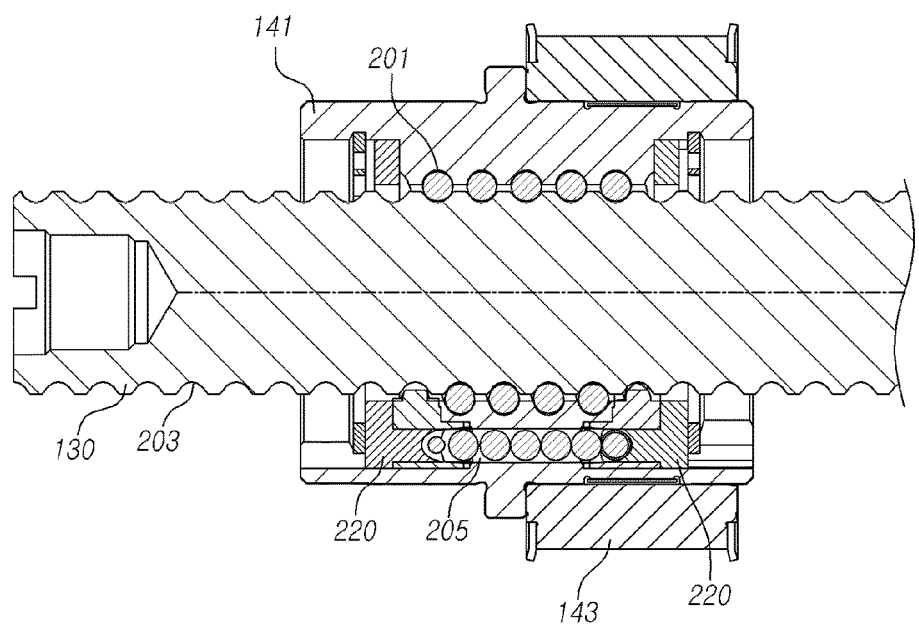
FIG. 2 is a schematic sectional view illustrating a part of the rack assist type power steering apparatus in the related art.

As illustrated in FIGS. 1 and 2 and these drawings, the rack assist type power steering apparatus, according to embodiments, includes: a ball nut 330 that is rotated by the rotating force transmitted from a motor (refer to reference numeral 121 of FIG. 1) and has an internal screw groove 334 formed in an inner circumferential surface thereof; and a rack bar 301 that includes an external-screw-groove-formed part 310 that has an external screw groove 314 formed in an outer circumferential surface thereof, and is coupled with the ball nut 330 by balls 450, wherein the external screw groove 314 has a first curved portion 410a and a second curved portion 410b connected to each other and is formed such that a contact angle formed by a line that is normal to a tangent line at a point where the ball 450 makes contact with the first curved portion 410a and a line that is normal to a tangent line at a point where the ball 450 makes contact with the second curved portion 410b gradually decreases from a central portion toward opposite end portions of the external-screw-groove-formed part 310.

The external screw groove 314 is formed in the rack bar 301 such that the ball nut 330 is coupled to the rack bar 301 by the balls 450 and has a cross-section with a Gothic arc shape in which the first curved portion 410a and the second curved portion 410b are connected to each other. The internal screw groove 334 with a Gothic arc shape, which corresponds to the external screw groove 314, is formed in the internal circumferential surface of the ball nut 330.

Further, the ball nut 330 is provided within a rack housing (not illustrated) through a bearing (not illustrated) that is coupled to one side of the outer circumferential surface thereof, and receives the rotating force of the motor 121 through a nut pulley (refer to reference numeral 207 of FIG. 2), which is coupled to the opposite side of the outer circumferential surface thereof, to slide the rack bar 301 coupled to the inside thereof.

The rack bar 301 is connected with tie rods (refer to reference numeral 133 of FIG. 1) that are connected to wheels (refer to reference numeral 131 of FIG. 1). The rack bar 301 receives the rotating force generated when a driver turns a steering wheel (refer to reference numeral 113 of FIG. 1) to perform a linear motion, thereby steering the wheels 131.

Further, the rack bar 301 includes the external-screw-groove-formed part 310 that has the external screw groove 314 formed along the rack bar 301 from one end of the outer circumferential surface of the rack bar 301.

When the rack bar 301 slides, friction is generated between the external-screw-groove-formed part 310, the ball nut 330, and the balls 450, and, in particular, friction is frequently generated at the central portion of the external-screw-groove-formed part 310. When the rack bar 301 slides, the angles of the tie rods 133 connected to the opposite ends of the rack bar 301 vary so that loads are applied to the opposite end portions of the external-screw-groove-formed part 310, the ball nut 330, and the balls 450.

Accordingly, the external-screw-groove-formed part 310 of the rack bar 301 is formed such that a contact angle formed by a line that is normal to a tangent line at a point where the ball 450 makes contact with the first curved portion 410a of the external screw groove 314 and a line that is normal to a tangent line at a point where the ball 450 makes contact with the second curved portion 410b of the external screw groove 314 gradually decreases from the central portion toward the opposite end portions of the external-screw-groove-formed part 310, thereby reducing the loads applied to the opposite end portions of the external-screw-groove formed part 310 while decreasing the friction at the central portion thereof.

The external-screw-groove-formed part 310 includes a first section 411, second sections 412, and third sections 413.

The first section 411 is the central portion of the external-screw-groove-formed part 310 and is located in the middle of the external-screw-groove-formed part 310. The first section 411 is formed such that a contact angle with the ball 450 is larger than that in the third sections 413, and has a length that is 20 to 30% of that of the external-screw-groove-formed part 310.

Since the ball nut 330 is usually coupled to the central portion of the external-screw-groove-formed part 310, and the rack bar 301 slides leftward and rightward into the ball nut 330 while steering, the first section 411 frequently makes contact with the balls 450. Namely, friction is frequently generated in the first section 411.

The third sections 413 are opposite end portions of the external-screw-groove-formed part 310 and are located on the opposite ends of the external-screw-groove-formed part 310. The third sections 413 are formed such that a contact angle with the ball 450 is smaller than that in the first section 411, and has a length that is 20 to 30% of that of the external-screw-groove-formed part 310.

When the third sections 413 slide into the ball nut 330, the angles of the tie rods 133 connected with the opposite ends of the rack bar 301 vary, and the loads applied to the opposite ends of the rack bar 301 increase. Accordingly, the loads applied to the balls 450 increase in the third sections 413.

Namely, when the rack bar 301 slides leftward and rightward into the ball nut 330 while steering, loads are applied to the opposite ends of the rack bar 301 while the angles of inner ball joints (not illustrated) of the tie rods 133, which are connected to the opposite ends of the rack bar 301, vary. As the left and right movement of the rack bar 301 increases, the varying angles of the tie rods 133 increase, and the loads applied to the opposite ends of the rack bar 301 increase.

In this regard, since large loads are applied to the opposite ends of the rack bar 301 in a state in which the left and right movement of the rack bar 301 increases so that the third section 413 is coupled to the inside of the ball nut 330, the loads acting on the balls 450 increase, which causes damage to the balls 450 or deteriorates the durability of the balls 450.

The second sections 412 are located between the first sections 411 and the third sections 413. The second sections 412 infrequently make contact with the balls 450 than the first section 411, and the loads acting on the balls 450 are smaller in the second sections 412 than in the third sections 413.

The external screw groove 314 is formed such that the radius of curvature of the first and second curved portions 410a and 410b gradually increases from the first section 411 toward the third section 413 of the external-screw-groove-formed part 310, and a contact angle gradually decreases accordingly.

Namely, the contact points between the ball 450, which is coupled to the external screw groove 314 to perform a rolling motion, and the first and second curved portions 410a and 410b become closer to each other from the first section 411 toward the third section 413 of the external-screw-groove-formed part 310, and a contact angle formed by a line that is normal to a tangent line at a point where the ball 450 makes contact with the first curved portion 410a and a line that is normal to a tangent line at a point where the ball 450 makes contact with the second curved portion 410b gradually decreases.

Accordingly, the friction generated when the ball 450 slides the rack bar 301 leftward and rightward decreases in the first section 411 of the external-screw-groove-formed part 310, and the load acting on the ball 450 decreases in the third section 413 of the external-screw-groove-formed part 310.

A detailed description will be given with reference to FIGS. 5 and 6. FIG. 5 illustrates that when the force $F_2$ that slides the rack bar 301 leftward and rightward is constant, the force $F_1$ by which the ball 450 slides the rack bar 301 leftward and rightward decreases as the contact angle A increases.

In the first section 411 of the external-screw-groove-formed part 310, a contact angle formed by a line that is normal to a tangent line at a point where the ball 450 makes contact with the first curved portion 410a and a line that is normal to a tangent line at a point where the ball 450 makes contact with the second curved portion 410b is greater than 90 degrees and is less than 120 degrees.

When the ball nut 330 is rotated by the rolling motion of the ball 450, the rack bar 301 slides leftward and rightward, and the first section 411, which is the central portion of the external-screw-groove-formed part 310, frequently contacts the ball 450 accordingly.

In a case where the contact angle A formed by the line that is normal to the tangent line at the point where the ball 450 makes contact with the first curved portion 410a and the line that is normal to the tangent line at the point where the ball 450 makes contact with the second curved portion 410b is 120 degrees as illustrated in the first section 411 of FIG. 5, the force $F_2$ that slides the rack bar 301 leftward and rightward is generated even though the force $F_1$ by which the ball 450 slides the rack bar 301 leftward and rightward is small, and since the force $F_1$ by which the ball 450 slides the rack bar 301 leftward and rightward is small, friction with the ball 450 is also small.

In contrast, in a case where the contact angle A formed by the line that is normal to the tangent line at the point where the ball 450 makes contact with the first curved portion 410a and the line that is normal to the tangent line at the point where the ball 450 makes contact with the second curved portion 410b is 40 degrees as illustrated in the third section 413 of FIG. 5, the force $F_1$ by which the ball 450 slides the rack bar 301 leftward and rightward is large so that friction with the ball 450 also increases because the force $F_2$ that slides the rack bar 301 leftward and rightward is generated when the force $F_1$ by which the ball 450 slides the rack bar 301 leftward and rightward is large.

Namely, since the force $F_1$ that the ball 450 applies to the external screw groove 314 while performing a rolling motion to generate the force $F_2$ that slides the rack bar 301 leftward and rightward decreases as the contact angle A increases, and the friction with the ball 450 also decreases accordingly, the first section 411 that frequently contacts the ball 450 while steering is formed to have a contact angle A that is greater than 90 degrees and less than 120 degrees.

In the first section 411 of the external-screw-groove-formed part 310, the friction generated between the ball 450 and the external screw groove 314 decreases as the contact angle A increases. When the contact angle A is greater than 120 degrees, the load caused by a change in the angles of the tie rods 133 is increased and transmitted to the rack bar 301 so that the load acting on the ball 450 increases, and noise and wear of the ball 450 are generated.

When the contact angle A of the first section 411 is less than 90 degrees, the effect of the present invention may not be obtained, and the friction generated between the ball 450 and the external screw groove 314 rather increases. Accordingly, it is desirable that the contact angle A of the first section 411 be greater than 90 degrees and less than 120 degrees. In this case, it is possible to reduce the friction caused by the contact between the ball 450 and the external screw groove 314 when the ball 450 performs a rolling motion, to reduce the noise due to this, and to effectively transmit power.

FIG. 6 illustrates that when the force $F_4$ caused by a change in the angles of the tie rods 133, which is applied to the rack bar 301, is constant, the force $F_3$ acting on the ball 450 decreases as a contact angle A decreases.

The third sections 413 are opposite end portions of the external-screw-groove-formed part 310. The third section 413 slides into the ball nut 330 when a driver steers to the maximum. In this state, the steering angle of the wheels is maximized, and the angles of the tie rods 133, which are connected with the rack bar 301, vary to the maximum. Accordingly, large loads are applied to the opposite ends of the rack bar 301, and a large vertical load is transmitted to the ball 450.

In a case where the contact angle A formed by the line that is normal to the tangent line at the point where the ball 450 makes contact with the first curved portion 410a and the line that is normal to the tangent line at the point where the ball 450 makes contact with the second curved portion 410b is 120 degrees as illustrated in the first section 411 of FIG. 6, the force $F_3$ acting on the ball 450, which makes contact with the external screw groove 314 of the rack bar 301, becomes larger when the force $F_4$ caused by a change in the angles of the tie rods 133 is transmitted to the opposite ends of the rack bar 301, which may cause damage to the ball 450 and may deteriorate the durability of the ball 450.

In contrast, in a case where the contact angle A formed by the line that is normal to the tangent line at the point where the ball 450 makes contact with the first curved portion 410a and the line that is normal to the tangent line at the point where the ball 450 makes contact with the second curved portion 410b is 40 degrees as illustrated in the third section 413 of FIG. 6, the force $F_3$ acting on the ball 450, which makes contact with the external screw groove 314 of the rack bar 301, becomes smaller when the force $F_4$ caused by a change in the angles of the tie rods 133 is transmitted to the opposite ends of the rack bar 301, which may prevent damage to the ball 450 and may improve the durability of the ball 450.

Namely, it can be seen that the force $F_3$ acting on the ball 450 decreases from the first section 411 toward the third section 413 when the force $F_4$ caused by the change in the angles of the tie rods 133 is applied to the rack bar 301. Accordingly, the third section 413 in which the force $F_3$ acting on the ball 450 increases has a contact angle A that is greater than 40 degrees and less than 90 degrees.

As described above, the force $F_3$ acting on the ball 450 decreases as the contact angle A of the third section 413 of the external-screw-groove-formed part 310 decreases. If the contact angle A is less than 40 degrees, the friction and noise generated between the ball 450 and the external screw groove 314 increase as the rack bar 301 slides leftward and rightward so that a driver may perceive an unpleasant feeling, and the power of the motor may not be effectively transmitted.

Further, when the contact angle A of the third section 413 is greater than 90 degrees, the effect of the present invention may not be obtained, and the force $F_3$ applied to the ball 450 by the rack bar 301 rather increases. Accordingly, it is desirable that the contact angle A of the third section 413 be greater than 40 degrees and less than 90 degrees. In this case, it is possible to reduce the load transmitted to the ball 450 from the rack bar 301 and to prevent damage to the ball 450, thereby improving the durability of the ball 450.

As a result, it is desirable that the first section 411 have a contact angle A that is greater than 90 degrees and less than 120 degrees and the third section 413 have a contact angle A that is greater than 40 degrees and less than 90 degrees.

Accordingly, the first section 411 has a constant contact angle A ranging from 90 degrees to 120 degrees, and the friction caused by the contact between the ball 450 and the external screw groove 314 when the ball 450 performs a rolling motion may further decrease as the constant angle increases.

The third section 413 has a constant contact angle A ranging from 40 degrees to 90 degrees, and as the constant angle decreases, the load transmitted to the ball 450 from the rack bar 301 may further decrease, thereby improving the durability of the ball 450.

The second section 412 has a constant contact angle A between the contact angle A of the first section 411 and the contact angle A of the third section 413, or has a contact angle A that gradually decreases from the first section 411 toward the third section 413.

Further, the second section 412 has a contact angle A between the contact angle A of the first section 411 and the contact angle A of the third section 413. The second section 412 has a contact angle A that gradually decreases from the first section 411 toward the second section 412 and gradually increases from the third section 412 toward the second section 412.

In this case, if the contact angle A sharply decreases from the first section 411 toward the second section 412, the feeling of stopping may be generated when the ball 450 performs a rolling motion. Accordingly, it is desirable that the contact angle A gradually decreases from the first section 411 toward the second section 412.

In addition, it is desirable that the contact angle A gradually increases from the third section 413 toward the second section 412.

According to the embodiments of embodiments having the above-described shape and structure, the central portion of the external-screw-groove-formed part, which frequently contacts the balls, can reduce the friction generated between the balls and the external screw groove while the rack bar slides leftward and rightward, thereby reducing noise, improving a driver's feeling of steering, and effectively transmitting the power of the motor to the rack bar.

In addition, the opposite end portions of the external-screw-groove-formed part, to which a large vertical load is applied, can reduce the loads that are applied to the balls by virtue of the vertical load to prevent damage to the balls and improve the durability of the balls, thereby reducing the loads applied to the balls while decreasing friction with the balls in the whole external-screw-groove-formed part.

Even if it was described above that all of the components of embodiments of the present invention are coupled as a single unit or coupled to be operated as a single unit, the present invention is not necessarily limited to these embodiments. That is, at least two elements of all structural elements may be selectively joined and operate without departing from the scope of the present invention.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

| Description of reference numerals | |
| --- | --- |
| 301: Rack bar | 314: External screw groove |
| 330: Ball nut | |
| 310: External-screw-groove-formed part | |
| 410a: First curved portion | |
| 410b: Second curved portion | |
| 411: First section | 412: Second section |
| 413: Third section | 334: Internal screw groove |
| 450: Ball | |

What is claimed is:

1. A rack assist power steering apparatus comprising:
a ball nut that is rotated by the rotating force transmitted from a motor and has an internal screw groove formed in an inner circumferential surface thereof; and
a rack bar that has an external-screw-groove-formed part that has an external screw groove formed in an outer circumferential surface thereof, and is coupled with the ball nut by a ball,
wherein the external screw groove is formed in a gothic arc shape in which a first curved portion and a second curved portion are connected to each other, and is formed such that a contact angle formed by a line that is normal to a tangent line at a point where the ball makes contact with the first curved portion and a line that is normal to a tangent line at a point where the ball makes contact with the second curved portion gradually decreases from a central portion toward opposite end portions of the external-screw-groove-formed part;
wherein the external-screw-groove-formed part has: a first section corresponding to the central portion thereof; third sections corresponding to the opposite end portions thereof; and second sections between the first section and the third sections, and the contact angle of the first section has a constant contact angle ranging from 90 degrees to 120 degrees;
wherein the contact angle of the third sections has a constant contact angle ranging from 40 degrees to 90 degrees; and
wherein the contact angle of the second sections has a constant angle between the contact angle of the first section and the contact angle of the third sections.

2. The rack assist power steering apparatus of claim 1, wherein the external screw groove is formed such that a radius of curvature of the first and second curved portions gradually increases from the central portion toward the opposite end portions of the external-screw-groove-formed part.

3. The rack assist power steering apparatus of claim 1, wherein the first section is formed to have a length that is 20 to 30% of that of the external-screw-groove-formed part, and the third sections are formed to have a length that is 20 to 30% of that of the external-screw-groove-formed part.

\* \* \* \* \*